(12) United States Patent
Beal

(10) Patent No.: US 6,577,556 B2
(45) Date of Patent: Jun. 10, 2003

(54) FREE-FLOATING ALTITUDE STABILIZED SYSTEM

(75) Inventor: Terrence E. Beal, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/972,294

(22) Filed: Oct. 5, 2001

(65) Prior Publication Data

US 2003/0067840 A1 Apr. 10, 2003

(51) Int. Cl.[7] ............................................... H04B 17/00
(52) U.S. Cl. ............................................. 367/12; 367/4
(58) Field of Search ........................ 367/12, 4; 441/21

(56) References Cited

U.S. PATENT DOCUMENTS 4,107,804 A * 8/1978 Bennett ........................ 367/4
5,020,032 A * 5/1991 Dale et al. .................... 367/4

* cited by examiner

Primary Examiner—Daniel T. Pihulic
(74) Attorney, Agent, or Firm—James M. Kasischke; Michael J. McGowan; Michael F. Oglo

(57) ABSTRACT

A free-floating altitude stabilized system is provided. Independently energizable wire coils are linearly aligned with one another in a vertical direction on a buoyant body. An induced magnetic field is generated by any of the wire coils that are energized. A float housing a magnet is coupled to the body in such a way that it is capable of independent movement relative thereto. A control system energizes a selected one or more of the wire coils in such a way the magnet's magnetic field and wire coil's induced magnetic field react with one another to generate movement of the float vertically in a direction that is the same as a vertical component of wave motion.

10 Claims, 2 Drawing Sheets

FREE-FLOATING ALTITUDE STABILIZED SYSTEM

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to free-floating devices, and more particularly to a free-floating system that adaptively adjusts to wave motion in order to maintain a predetermined altitude of the system at the water's surface or at some predetermined depth.

(2) Description of the Prior Art

A variety of floating systems are used to keep radio or acoustic communication links above the water's surface. Frequently, to maintain operable communication links, it is necessary for the communication equipment (e.g., acoustic, optical, electronic, etc.) to maintain a stable or constant altitude. This is especially true when the communication equipment is part of a tracking system where changes in altitude can cause signal disturbances that lead to corrupt distance measurements.

SUMMARY OF THE INVENTION

Accordingly, it is an object of the present invention to provide a system that can freely float at the water's surface and adaptively stabilize itself in terms of altitude in the presence of wave motion.

Another object of the present invention is to provide a free-floating altitude stabilized system for maintaining a floating body at a predetermined altitude in the water in the presence of wave motion.

Other objects and advantages of the present invention will become more obvious hereinafter in the specification and drawings.

In accordance with the present invention, a free-floating altitude stabilized system includes a body that is buoyant in the water at a predetermined water depth. A plurality of wire coils are linearly aligned with one another in a vertical direction and coupled to the body. Each wire coil is independently energizable such that an induced magnetic field is generated by any of the wire coils that are energized. A float is coupled to the body in such a way that it is capable of independent movement relative thereto. A magnet, fixedly coupled to the float, emits a magnetic field. A control system is provided to energize a selected one or more of the wire coils in such a way the magnetic field and induced magnetic field react with one another to generate movement of the float vertically in a direction that is the same as a vertical component of wave motion.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
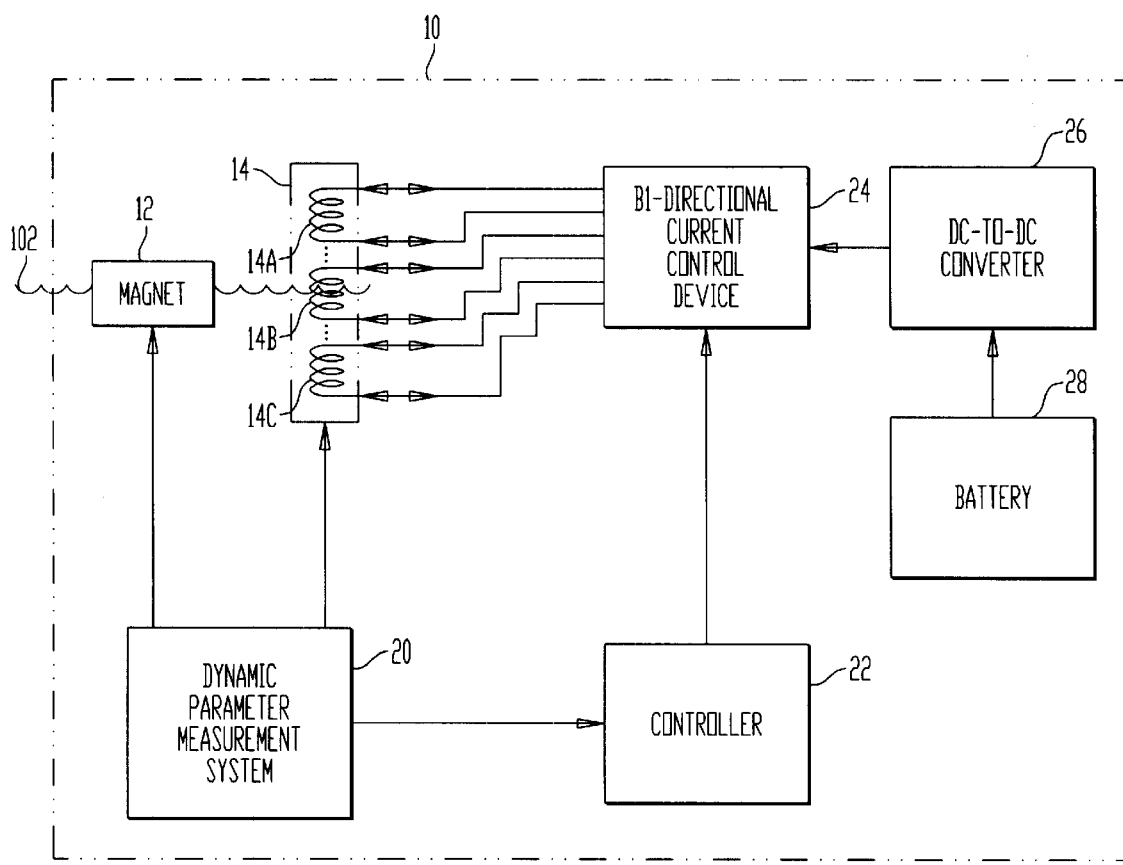
FIG. 1 is a schematic diagram of a free-floating altitude stabilized system according to an embodiment of the present invention.

Referring now to the drawings, and more particularly to FIG. 1, a free-floating altitude stabilized system according the present invention is contained within dashed-line box referenced by numeral 10. Altitude stabilized system 10 can be positioned at the water's surface or at some predetermined depth in the open ocean, sea or a river. Thus, it is to be understood that the choice of water venue and depth of system 10 are not limitations of the present invention. However, by way of illustrative example, it will be assumed that the desired altitude for system 10 is at the water's surface referenced by numeral 102.

Altitude stabilized system 10 includes a magnet structure 12 and a wire coil structure 14. Each of magnet structure 12 and wire coil structure 14 are maintained on bodies (not shown in FIG. 1) that are mechanically coupled to one another while also being capable of independent flotation and movement at water surface 102. Further, both magnet structure 12 and wire coil structure 14 are untethered. That is, they are both freely-floating at (or near) water surface 102 so that both freely experience surface wave motion occurring at or near water surface 102.

The basic operating principle utilized by the present invention can be explained as follows. Magnet structure 12 is a permanent magnet or an electromagnet that emits a magnetic field. Wire coil structure 14 is a vertical, linear arrangement of independently energizable wire coils, three of which are illustrated as coils 14A, 14B and 14C. Additional or fewer coils can be used without departing from the scope of the present invention. When one or more of coils 14A-14C are energized (i.e., supplied with current), an induced magnetic field is generated. Depending on the location and direction of the induced magnetic field, the magnetic field of magnet structure 12 is either repelled or attracted by the induced magnetic field generated by the energized portion of wire coil structure 14. The repulsion or attraction reaction between magnet structure 12 and wire coil structure 14 causes relative movement of magnet structure 12. The amount and direction of relative movement of magnet structure 12 is determined by the strength and direction of the induced magnetic field generated by wire coil structure 14.

The remaining portion of altitude stabilized system 10 is an adaptive control loop that controls the location and direction of the induced magnetic field. Location of the induced magnetic field is controlled by selecting which one or more of wire coils 14A–14C to energize. The control loop controls the direction of the induced magnetic field by controlling the direction in which electric current will flow through the selected wire coil(s).

The control loop includes a dynamic parameter measurement system 20 coupled to structures 12 and 14 for measuring various dynamic parameters that describe the relative movement between structures 12 and 14. These dynamic parameters include vertical acceleration of wire coil structure 14 and the position/velocity of magnet structure 12 relative to wire coil structure 14. It is to be understood that the particular devices/methods used to obtain these parameters is not a limitation of the present invention. However, by way of example, an embodiment of the present invention will be explained in detail later in the description.

Measurement system 20 supplies inputs to a controller 22 which processes the inputs in accordance with a desired function. The goal of the function can be tailored for a given application. For example, in the illustrative case of trying to stabilize the altitude of system 10 at water surface 102, the control function will operate to keep vertical acceleration of wire coil structure 14 at zero. To do this, controller 22 processes the data supplied thereto and generates a control signal for a bi-directional current control device 24. Based on this control signal, current control device 24 supplies electric current in a selected direction to selected one(s) of wire coils 14A–14C. Such current control devices are well known in the art and will not be described further herein. The current to be controlled by device 24 can be generated by a combination of a DC-to-DC converter 26 powered by a battery 28. Voltage supplied by battery 28 should be sufficient to overcome any back EMF in wire coil structure 14.

Figure 2:
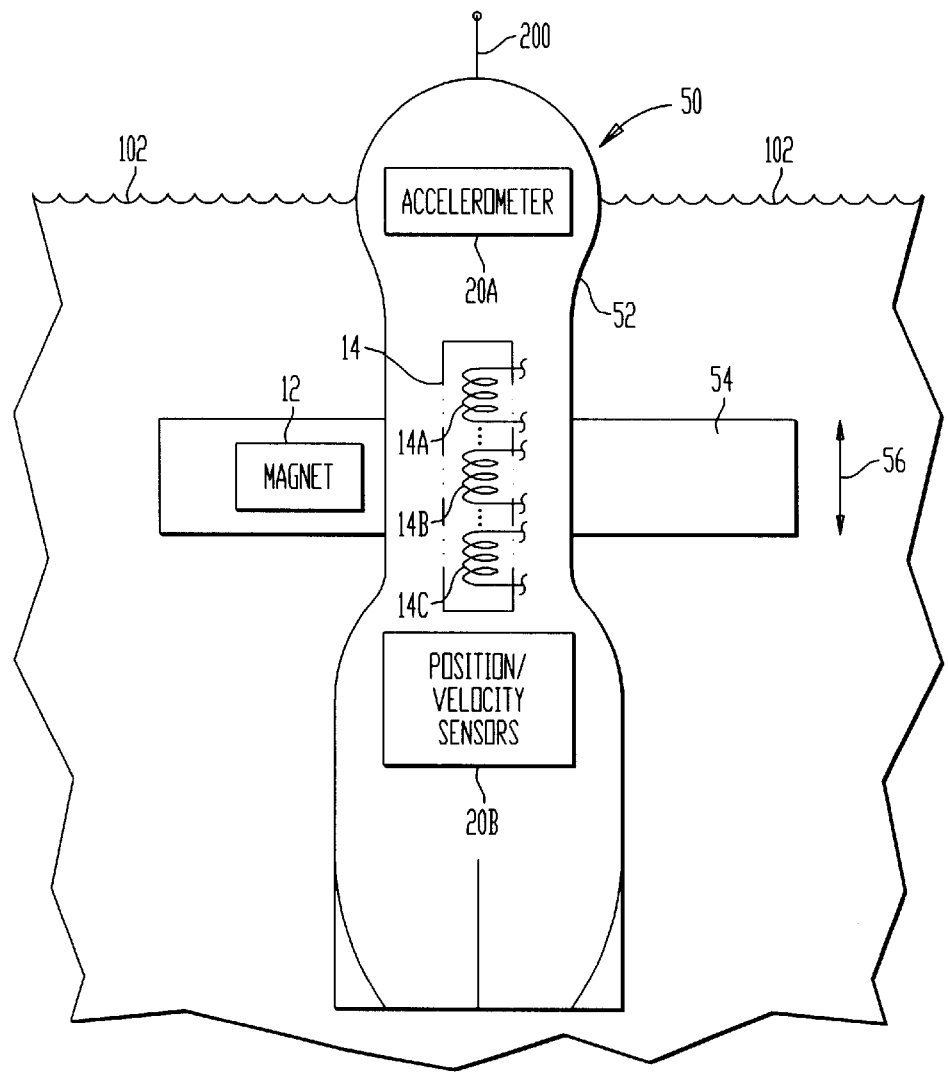
FIG. 2 is a schematic illustration of an unmanned underwater vehicle (UUV) equipped with the free-floating altitude stabilized system of the present invention.

Altitude stabilizing system 10 can be incorporated in a variety of sea-going systems. By way of example, system 10 could be included on an unmanned underwater vehicle (UUV) having an onboard system (not shown in FIG. 1) that must be maintained at or above water surface 102. A representative example of such an embodiment is illustrated in FIG. 2 where a UUV 50 has a body 52 housing wire coil structure 14 and a flotation collar 54 housing magnet structure 12. Dynamic parameter measurement system 20 (FIG. 1) can be realized by an accelerometer 20A mounted on/in body 52 and position/velocity sensors 20B mounted on/in body 52 for sensing the position and velocity of collar 54 relative to body 52. The remaining control loop elements of altitude stabilized system 10 described above are omitted from FIG. 2 for clarity of illustration.

Body 52 is buoyant in the water at a predetermined depth of operation which, for the illustrated embodiment, is at water surface 102 such that a small portion of body 52 extends above water surface 102. A communications link (represented by antenna 200) could be housed/supported by the portion of body 52 that extends above water surface 102. For purpose of illustration, the altitude of this portion of body 52 must be maintained for proper operation of communications link 200. Collar 54 can be disposed about body 52. Collar 54 is coupled to body 52 such that it can freely travel or ride up and down on body 52 as indicated by two-headed arrow 56.

Referring now simultaneously to FIGS. 1 and 2, an operational example of the present invention will be described. For discussion purposes, it will be assumed that wave motion at water surface 102 is such that body 52 will tend to experience downward motion. That is, the vertical component of the wave motion is directed downward.

As body 52 begins to descend, accelerometer 20A detects the downward acceleration of body 52, while the position and velocity of magnet structure 12 is detected by position/velocity sensors 20B. The sensed data is processed by a control function programmed into controller 22. In the case of maintaining body 52 at water surface 102, the control function determines which one or more of wire coils 14A–14C must be energized such that magnet 12/collar 54 can be driven vertically downward at a higher velocity than the vertical component of wave motion. This downward movement of collar 54 will create a reactive force between collar 54 and body 52 that will tend to drive body 52 upward relative to collar 54. Note that the wire coil(s) to energize and current direction can be selected to create a repulsive or attractive reaction between magnet structure 12 and the energized one(s) of wire coils 14A–14C. This type of control will continue during the duration of downward wave motion with the control function operating to minimize or zero the vertical acceleration of body 52. When the wave motion reverses direction, the control process is repeated except that collar 54 will be driven upward.

The above-described reactive force occurring between collar 54 and body 52 is an electromagnetic force "F" that results from wire coil structure 14 moving through the magnetic fields of magnet structure 12. Force F is a function of magnetic flux B generated by magnet structure 12, the total length "l" of the energized one(s) of wire coils 14A–14C moving through flux B, and the current "i" supplied to the selected wire coil(s). Specifically, $$F = Bli \quad (1)$$

Therefore, current control device 24 can control the location and direction of electromagnetic force F acting between collar 54 and body 52 to effectively control the relative movement therebetween by i) controlling which coil(s) receives current and ii) controlling the direction of the current.

Using the above described approach, a control method can be derived (for use by controller 22) to, for example, zero the vertical acceleration of body 52. By constantly operating controller 22 with a goal of zeroing vertical acceleration of body 52, the present invention automatically adapts to changing wave conditions while stabilizing the altitude of body 52.

Figure 3:
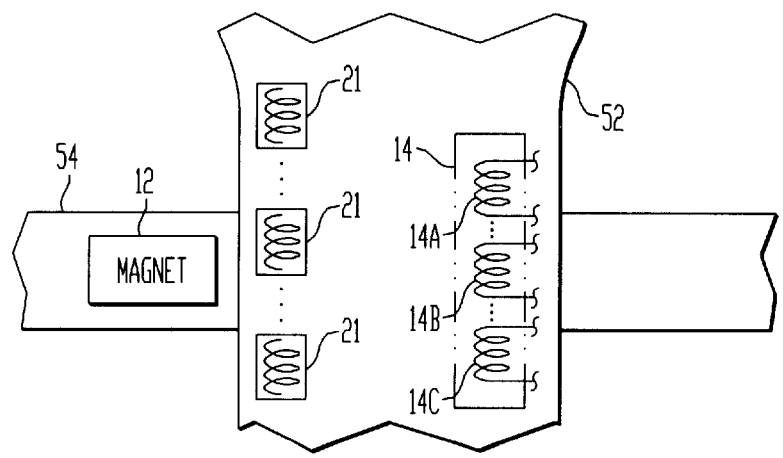
FIG. 3 is a enlarged partial view of the UUV in FIG. 2 illustrating the use of magnetic field sensors positioned linearly and vertically along the UUV body for sensing the position and velocity of the surrounding flotation collar.

Position/velocity sensors 20B can be implemented in a variety of ways. One way is illustrated in FIG. 3 where a plurality of magnetic field sensors 21 are distributed linearly along the length of body 52. Each of sensors 21 could be a Hall effect sensing coil that senses the magnetic field from magnet structure 12. Controller 22 would use the outputs of sensors 21 to determine both position and velocity of magnet 12/collar 54 as would be understood by one of ordinary skill in the art.

The advantages of the present invention are numerous. A free-floating system can have its altitude in the water stabilized in an autonomous and adaptive fashion. Thus, the present invention can adapt to changing wave conditions. This will make the present invention useful as support housing for any communications or other system that needs to be maintained at a stabilized altitude at the water's surface or at a specific depth thereunder.

Although the present invention has been described relative to a specific embodiment thereof, it is not so limited. Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A free-floating altitude stabilized system, comprising:
   a body that is buoyant in the water at a predetermined water depth;
   a plurality of wire coils linearly aligned with one another in a vertical direction and coupled to said body, each of said plurality of wire coils being independently energizable wherein an induced magnetic field is generated by each of said plurality of wire coils so-energized;

a float coupled to said body and capable of independent movement relative thereto;

a magnet fixedly coupled to said float for emitting a magnetic field; and means, responsive to effects of wave motion acting on said body and said float, for energizing a selected at least one of said plurality of wire coils, wherein said magnetic field and said induced magnetic field generated by said selected at least one of said plurality of wire coils react with one another to generate movement of said float vertically in a direction that is the same as a vertical component of said wave motion.

2. A free-floating altitude stabilized system as in claim 1 wherein said float forms a collar that surrounds said body.

3. A free-floating altitude stabilized system as in claim 1 wherein said magnet is a permanent magnet.

4. A free-floating altitude stabilized system as in claim 1 wherein said magnet is an electromagnet.

5. A free-floating altitude stabilized system as in claim 1 wherein said means for energizing comprises:

sensing means coupled to said body for sensing i) vertical acceleration of said body, ii) position of said float, and iii) velocity of said float relative to said body;

control means coupled to said sensing means for determining said selected at least one of said plurality of wire coils based on said vertical acceleration, said position of said float and said velocity of said float; and a current source coupled to said control means and said plurality of wire coils for supplying current to said selected at least one of said plurality of wire coils wherein said movement of said float results, and wherein said movement of said float negates said vertical acceleration of said body.

6. A free-floating altitude stabilized system, comprising:

a body that is buoyant in the water at a predetermined water depth;

a plurality of wire coils linearly aligned with one another in a vertical direction and coupled to said body, each of said plurality of wire coils being independently energizable wherein an induced magnetic field is generated by each of said plurality of wire coils so-energized;

a float coupled to said body and capable of independent movement relative thereto;

a magnet fixedly coupled to said float for emitting a magnetic field;

an accelerometer coupled to said body for sensing vertical acceleration thereof due to wave motion;

a plurality of magnetic field sensors distributed linearly and vertically along said body for detecting said magnetic field as an indication of position and velocity of said float; and current control means, responsive to said vertical acceleration and said position and velocity of said float, for supplying current a selected at least one of said plurality of wire coils wherein said magnetic field and said induced magnetic field generated by said selected at least one of said plurality of wire coils react with one another to generate movement of said float vertically in a direction that is the same as a vertical component of said wave motion, and wherein said movement of said float negates said vertical acceleration of said body.

7. A free-floating altitude stabilized system as in claim 6 wherein said float forms a collar that surrounds said body.

8. A free-floating altitude stabilized system as in claim 6 wherein said magnet is a permanent magnet.

9. A free-floating altitude stabilized system as in claim 6 wherein said magnet is an electromagnet.

10. A free-floating altitude stabilized system as in claim 6 wherein each of said plurality of magnetic field sensors is a Hall effect device.

* * * * *